United States Patent [19]
Fanelli et al.

[11] Patent Number: 5,219,052
[45] Date of Patent: Jun. 15, 1993

[54] WHEEL CYLINDER BOOT WITH ANNULAR RINGS

[75] Inventors: Michael W. Fanelli, Centerville; Gary G. Holliday, Vandalia; John R. Vallo, Jr., Dayton, all of Ohio

[73] Assignee: General Motors Corporation, Detroit, Mich.

[21] Appl. No.: 825,216

[22] Filed: Jan. 24, 1992

[51] Int. Cl.⁵ .................. F16D 51/24; F16J 15/32
[52] U.S. Cl. ................... 188/364; 188/327; 277/212 FB
[58] Field of Search .......... 188/325, 327, 328, 363, 188/364; 277/212 FB

[56] References Cited

U.S. PATENT DOCUMENTS

| | | |
|---|---|---|
| 2,740,498 | 4/1956 | Trahern, Jr. .................. 188/327 |
| 2,776,864 | 1/1957 | Powlas ....................... 188/364 X |
| 3,842,621 | 10/1974 | Mazziotti .................. 277/212 FB X |
| 3,901,518 | 8/1975 | Uchida ....................... 277/212 FB |
| 4,678,067 | 7/1987 | Thompson .................... 188/328 |
| 4,957,469 | 9/1990 | Zollinger ................. 277/212 FB X |
| 4,967,609 | 11/1990 | Takagi et al. ............ 277/212 FB X |

FOREIGN PATENT DOCUMENTS

| | | |
|---|---|---|
| 1069480 | 11/1959 | Fed. Rep. of Germany ...... 277/212 FB |
| 2842638 | 4/1979 | Fed. Rep. of Germany ...... 188/328 |
| 3814695 | 11/1989 | Fed. Rep. of Germany ...... 277/212 FB |

Primary Examiner—Robert J. Oberleitner
Assistant Examiner—Alfred Muratori
Attorney, Agent, or Firm—Ernest E. Helms

[57] ABSTRACT

The present invention provides a vehicle wheel cylinder for a drum type brake. The sealing boot which seals the wheel cylinder frame and piston is provided in a preferred embodiment with annular rings which help protect the integrity of the sealed relationship of the annular boot with the bore of the wheel cylinder against damage which can be caused by contact of the sealing boot with a web of a brake shoe.

9 Claims, 1 Drawing Sheet

WHEEL CYLINDER BOOT WITH ANNULAR RINGS

FIELD OF THE INVENTION

The field of the present invention is that of wheel cylinders for vehicle drum type brakes and methods of utilization of the same.

DISCLOSURE STATEMENT

Vehicle wheel drum brakes typically have two brake shoes which are pivotally mounted to a backing plate which is connected with axle housing of the vehicle. A hydraulic wheel cylinder pushes the brake shoes outwardly causing the brake shoes to make contact with a rotating drum which is connected with the vehicle wheel.

With the advent of front-wheel drive cars, especially those with disc brakes for the front wheels, more vehicles utilize leading-trailing type vehicle wheel brakes for the rear wheels. Leading-trailing type drum brakes tend to give a more linear torque output with respect to the pressure experienced in the wheel cylinder as compared with torque versus pressure output of dual servo type wheel brakes. Leading-trailing vehicle wheel brakes have two brake shoes which are pivoted against a bottom anchor and typically make direct contact with opposing pistons of the wheel cylinder. Sealably connected with the pistons and with a longitudinally bored cylindrical frame of the wheel cylinder are elastomeric sealing boots. The elastomeric sealing boots are provided to keep dust and other foreign matter from entering into the longitudinal bore of the wheel cylinder. An example of a leading-trailing vehicle brake is provided in Copp, U.S. Pat. No. 4,886,146.

In a leading-trailing brake, the brake shoes are not pivotally tied to one another at their bottom end as in the case with dual servo brakes. The point of contact of the vehicle brake shoe web with the brake cylinder piston tends to vertically float somewhat and seeks its own center as the brake linings wear. The above-noted flotation of the point of contact of the brake shoe web with the brake cylinder piston can in certain circumstances cause the web of the brake shoe to also make contact with the sealing boot causing damage to the same.

SUMMARY OF THE INVENTION

The present invention endeavors to provide substantially total freedom from violation of the sealed sanctum, provided by the dust boot of the wheel cylinder, which may be caused by engagement of the brake shoe web with the dust boot. The present invention provides such freedom by bringing forth a wheel cylinder with a sealing boot having sacrificial bumpers, typically integrally molded with the boot which upon contact with the edges of the shoe web prevents contact of the shoe web with the remainder of the boot along any position of the piston within the wheel cylinder. Additionally, it has been found that the bumper rings protect the boot during the manufacturing and assembly process as well as when the brake is serviced.

It is an object of the present invention to provide a vehicle brake drum cylinder which provides an alternative to that provided in the past.

Other objects, desires and advantages of the present invention can become more apparent to those skilled in the art as the nature of the invention is better understood from the accompanying drawings and a detailed description.

DETAILED DESCRIPTION OF THE DRAWINGS

Figure 1:
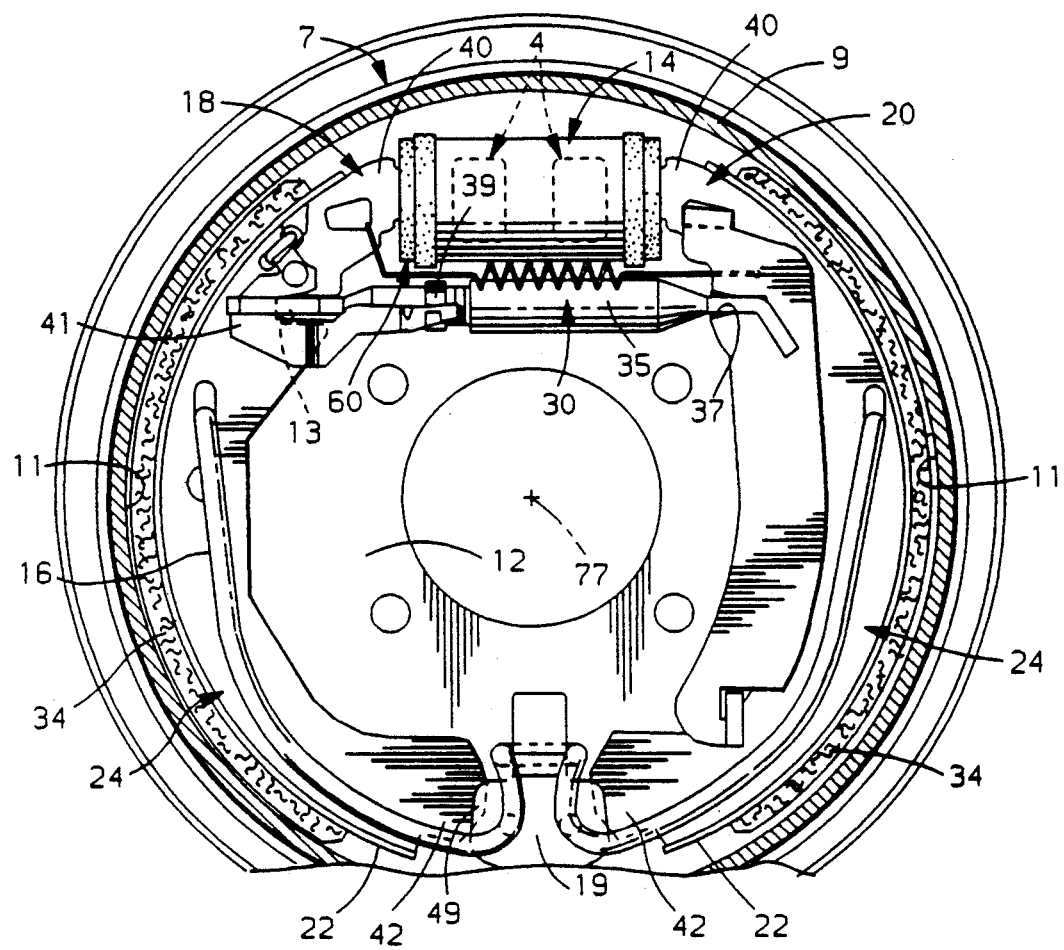
FIG. 1 is an elevational view of a drum brake assembly employing the invention, with portions broken away and in section.
Figure 2:
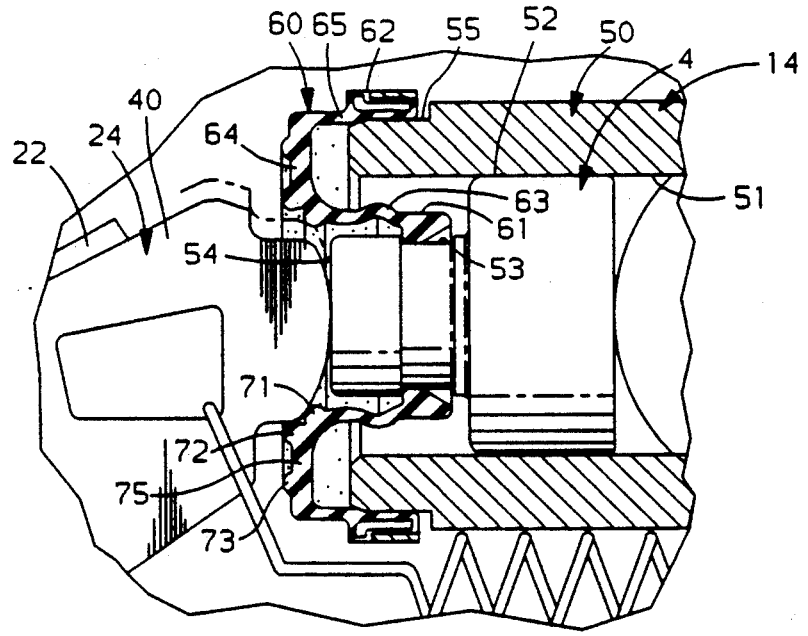
FIG. 2 is an enlarged sectional view of a portion of the brake drum in FIG. 1.

The drum brake assembly 7 of FIG. 1 includes a rotatable drum 9 having an internal drum friction surface 11. The assembly has a backing plate 12 on which is mounted a first brake shoe assembly 18 and a second brake shoe assembly 20 for movement into and out of engagement with the drum friction surface 11 for brake actuation and release, as is well known in the art.

The brake shoes 18 and 20 both have a rim 22 and a web 24. The web 24 is generally perpendicular to the axis of rotation 77 of the drum 9. Both shoe assemblies 18, 20 also have a brake lining 34 secured to their rim 22. The outer surfaces of the linings 34 provide lining friction surfaces which mate with the drum friction surface 11 during brake actuation. The shoe assemblies 18 and 20 respectively have upper shoe ends 40 and lower shoe ends 42. The upper shoe ends are arranged to be operatively engaged by a respective piston 4 in a wheel cylinder 14 so that the shoe assembly may be hydraulically actuated for service brake operation. As is well known in the art, a suitable service brake operator, such as a master cylinder (not shown), provides hydraulic brake fluid under pressure to the wheel cylinder 14 to extend the pistons 4 outward to move the shoe ends 40 apart so that the linings 34 are moved into braking engagement with the drum friction surface 11. In the particular brake assembly 7 illustrated, the brake shoe assemblies are arranged in a leading-trailing manner. Therefore, the lower shoe ends 42 are positioned to engage a fixed anchor 19 at the bottom of the brake assembly radially opposite the wheel cylinder 14. The lower shoe ends 42 are guided in position relative to the backing plate by the shoe retainer 49 which is secured to anchor 19.

The drum brake assembly 7 may also be of other well known types such as the duo servo, leading-leading, and trailing-trailing types. A suitable brake shoe return spring 16 is connected to the brake shoe webs 24 so as to continually urge the upper shoe ends 40 toward the retracted position. This arrangement is also well known in the art.

The brake assembly is illustrated as having a brake adjuster mechanism 30, which includes a spreader bar or strut 35, an adjuster wheel 39, and an adjuster lever 41, all well known in the art. The spreader bar or strut 35 is typically provided in two pieces threadedly joined for adjusting purposes. The strut 35 extends into recesses 37 and 13 formed in brake shoe webs 24.

The wheel cylinder 14 with generally cylindrical frame 50 and longitudinal bore 51 has slidably mounted within the longitudinal bore, opposed pistons 4. (Both sides of the wheel cylinder are identical, therefore in the interest of brevity only one side of the wheel cylinder 14 is shown and described in the present application.) The piston 4 has a first diameter 52 which is slidably mounted within the wheel cylinder 14. The piston diameter 52 may be sealed or alternatively a sealing boot may be utilized. Typically the piston 4 will abut a sealing piston or cup seal (not shown) which will then seal the fluid within the wheel cylinder 4. The piston 4 has a second smaller diameter 53 providing a peripheral mounting sealing surface. The piston 4 also has a contact surface 54 which provides the point of contact with the brake shoe web 38 with the piston 4.

The wheel cylinder frame 50 has an annular cutout 55 providing a mounting sealing surface. Sealably connected with the mounting surfaces 55, 53 of the wheel cylinder frame and on the piston is a flexible elastomeric sealing boot 60 commonly referred to as the dust boot. The dust boot has a generally U-shaped cross-sectional area having its inner diametrical bead head 61 connected with the piston 4 and the outer diametrical bead head 62 connected with the wheel cylinder frame 50. A first leg 63 of the U-shape is generally parallel with the frame bore 51 and is joined with a second generally perpendicular leg 64 which is then joined with a third generally parallel leg 65 which connects with the frame peripheral sealing surface. The boot 60 therefore seals the interior of the frame bore 51.

The boot 60 has a series of three angular raised bumpers 71, 72 and 73. The bumpers have a circular or sinusoidal cross-section which have a blended radius to a general surface of the bumper. The bumpers have a sheet portion 75 general thickness which may vary slightly. Two of the bumpers 71, 72 are located generally along the intersection of the first and second legs 63, 64 of the boot 60 and the third bumper 73 is located generally along the end of the second leg 64 adjacent to where it joins with the third leg 63 of the boot.

In operation when the piston 4 is at its inner most location, (typically when the brake is released and the brake lining 34 is new) only the outer most bumper 73 will ever contact the shoe web. The contact with the bumper 73 will prevent further contact of the shoe web 24 with the sheet portion 75 of the boot 60. As the piston 4 is positioned outwardly upon actuation of the brake or upon adjustment of the piston 4 due to outward adjustment of the shoes 18, 20 the intermediate bumper 72 will make contact sequentially and further outward movement will cause additional contact of the inner most bumper 71 with the shoe web 24.

The bumpers 71, 72, 73 not only protect the integrity of the boot 60 by preventing contact with the shoe web with the sheet portion 75 but also act as a sacrificial area which can absorb cuts or scalding caused by the high temperature of the brake shoe web 24. Although the polymeric material utilized for the boot 60 typically will have a high notch sensitivity, it has been found that notches in the bumper typically will not propagate any further than the thickness of the bumper and will not propagate further to the underlying sheet material of the boot. Additionally, the bumpers 71, 72, 73 add rigidity to the boot 60 and therefore the boot 60 will flex in a more jerky motion which helps maintain contact with the web 24 with the bumpers 71, 72, 73 rather than allowing a smooth flowing motion which would more readily allow contact with the web 24 with the underlying sheet material 75.

Although not directly related to the functionality of its operation of its environment, the bumpers 71, 72, 73 have been found to beneficial by strengthening the boot 60 and allowing it to be more easily separated from its mode.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A fluid activated wheel cylinder for a vehicle drum brake for forcing outwardly a brake shoe, mounted to a backing plate connected with a vehicle, to contact a vehicle wheel drum to restrain rotation of the wheel drum, the brake shoe having a web portion projecting in a plane generally perpendicular to the axis of rotation of the drum, the wheel cylinder comprising:

a frame with means of connection with a backing plate, the frame having a bore and an outer sealing surface;

a piston slidably mounted within the bore having a peripheral sealing surface and being locationally responsive to fluid pressure within the bore, the piston having a mating surface projecting towards the shoe web for making contact with the shoe web;

and an annular flexible polymeric sealing boot surrounding and being sealably connected with the piston sealing surface along an inner diameter and the frame sealing surface along an outer diameter thereby sealing the frame bore, the boot having a generally U-shaped cross-sectional area, the boot having a first general thickness with raised bumpers, the bumpers sequentially preventing contact between the remainder of the sealing boot and the shoe web as the piston moves in all positions within the bore to protect the integrity of the boot sealing relationship with the frame bore.

2. A wheel cylinder as described in claim 1 wherein said piston has a first larger diameter for sliding within the bore and a second smaller diameter projecting towards the shoe web and providing the piston sealing surface.

3. A wheel cylinder as described in claim 1 wherein one of the bumpers is provided by an annular ring.

4. A wheel cylinder as described in claim 3 wherein the ring has a generally circular cross-sectional shape.

5. A wheel cylinder as described in claim 4 wherein the circular ring has a blend-in radius with the remainder of the boot.

6. A wheel cylinder as described in claim 3 wherein there is a series of annular rings.

7. A wheel cylinder as described in claim 6 wherein the boot has a first inner section joined to a second generally perpendicular section joined to an outer third section and wherein there are two rings generally adjacent the intersection of the boot first and second sections and a third ring on the boot on an end of the boot second section most adjacent to the third section.

8. A fluid activated wheel cylinder for a vehicle drum brake for forcing outwardly a brake shoe, mounted to a backing plate connected with a vehicle, to contact a vehicle wheel drum to restrain rotation of the wheel drum, the brake shoe having a web portion projecting generally in a plane perpendicular to the axis of the rotation of the drum, the wheel cylinder comprising:

a frame with means of connection with the backing plate, the frame having a longitudinal bore;

a dual diametered piston having a first diameter slidably mounted within the bore and a second smaller diameter with a peripheral mounting surface, the piston being locationally responsive to fluid pressure within the bore, the piston also having a mating surface projecting towards the shoe web for making contact with the shoe web;

and an annular flexible polymeric sealing boot surrounding and being sealably connected with the piston mounting surface along an inner diameter and the frame along an outer diameter thereby sealing the frame bore, the boot having a generally U-shaped cross-sectional area with a first leg orientated generally parallel with the longitudinal bore and a second perpendicular leg generally perpendicular to the longitudinal bore and a third leg generally perpendicular to the first leg, the boot having a first general thickness with raised bumpers on a side of the boot opposite the bore formed by a series of raised rings having a generally circular cross-sectional area with a radius blending in with the remainder of the sealing boot, two of the bumpers being generally adjacent an intersection of the first and second legs of the boot and the third bumper being adjacent to the end of the second leg of the boot which is adjacent to the third leg of the sealing boot, the bumpers sequentially preventing contact between the remainder of the boot and the shoe web as the piston moves in all positions within the bore to protect the integrity of the boot sealing relationship with the bore.

9. A method of forcing outwardly a brake shoe mounted to a backing plate connected with a vehicle with a fluid actuated wheel cylinder, to contact a vehicle wheel drum to restrain rotation of the vehicle wheel drum, the brake shoe having a web portion projecting generally in a plane perpendicular to the axis of rotation of the drum, the method comprising:

connecting with the vehicle backing plate a frame with a bore;

slidably mounting within the bore a piston having a peripheral mounting surface and which is locationally responsive to fluid pressure within the bore, and the piston having a mating surface projecting towards the shoe web for making contact with the shoe web;

and surrounding and sealably connecting with the piston an annular flexible polymeric sealing boot along an inner diameter, having a U-shaped cross-section, sealably connecting the inner diameter of the sealing boot with the piston mounting surface and sealably connecting the outer diameter of the sealing boot with the frame along an outer diameter of the sealing boot which has a U-shaped cross-sectional area and raised bumpers; and sequentially contacting the bumpers of the sealing boot with the shoe web to prevent the shoe web from making contact with the remainder of the boot thereby protecting the integrity of the boot's sealing relationship with the frame bore.

* * * * *